(12) United States Patent
Joshi et al.

(10) Patent No.: US 9,672,090 B2
(45) Date of Patent: Jun. 6, 2017

(54) SYSTEM AND METHOD FOR ERROR HANDLING BASED ON A BOOT PROFILE

(71) Applicant: Dell Products, LP, Round Rock, TX (US)

(72) Inventors: Anand P. Joshi, Round Rock, TX (US); Dirie N. Herzi, Leander, TX (US)

(73) Assignee: DELL PRODUCTS, LP, Austin, TX (US)

( * ) Notice: Subject to any disclaimer, the term of this patent is extended or adjusted under 35 U.S.C. 154(b) by 120 days.

(21) Appl. No.: 14/668,253

(22) Filed: Mar. 25, 2015

(65) Prior Publication Data
US 2016/0283311 A1    Sep. 29, 2016

(51) Int. Cl.
*G06F 11/00*    (2006.01)
*G06F 11/07*    (2006.01)

(52) U.S. Cl.
CPC ...... *G06F 11/0775* (2013.01); *G06F 11/0706* (2013.01); *G06F 11/0751* (2013.01); *G06F 11/0766* (2013.01); *G06F 11/0772* (2013.01)

(58) Field of Classification Search
CPC ............. G06F 11/0775; G06F 11/0706; G06F 11/0751; G06F 11/0772; G06F 11/0766; G06F 11/0769; G06F 11/0781; G06F 11/3065; G06F 11/3086

USPC ..................................................... 714/57, 48
See application file for complete search history.

(56) References Cited

U.S. PATENT DOCUMENTS

| | | | |
|---|---|---|---|
| 8,316,237 B1 | 11/2012 | Felsher et al. | |
| 8,448,719 B2 | 5/2013 | Furukawa | |
| 2008/0256400 A1* | 10/2008 | Yang | G06F 11/0745 714/57 |
| 2009/0287950 A1* | 11/2009 | Piazza | G06F 11/0709 714/2 |
| 2010/0325490 A1* | 12/2010 | Anvin | G06F 11/0748 714/37 |
| 2011/0051602 A1 | 3/2011 | Matthews et al. | |
| 2012/0221901 A1* | 8/2012 | Tanaka | G06F 11/0709 714/57 |
| 2013/0124928 A1* | 5/2013 | Daily | G05B 19/0423 714/48 |
| 2014/0129882 A1* | 5/2014 | Harden | G06F 11/0766 714/57 |
| 2014/0281758 A1* | 9/2014 | Klein | G06F 11/327 714/57 |

* cited by examiner

*Primary Examiner* — Joseph D Manoskey
(74) *Attorney, Agent, or Firm* — Larson Newman, LLP

(57) ABSTRACT

An information handling system includes a video interface and an error handler including a service profile. The error handler detects an error in an operation of the information handling system, generates an error report in response to detecting the error, generates a Quick Response (QR) code based on the error report, and sends the QR code to the video interface based upon the service profile.

20 Claims, 3 Drawing Sheets

SYSTEM AND METHOD FOR ERROR HANDLING BASED ON A BOOT PROFILE

FIELD OF THE DISCLOSURE

This disclosure generally relates to information handling systems, and more particularly relates to a system and method for error handling based on a boot profile.

BACKGROUND

As the value and use of information continues to increase, individuals and businesses seek additional ways to process and store information. One option is an information handling system. An info nation handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
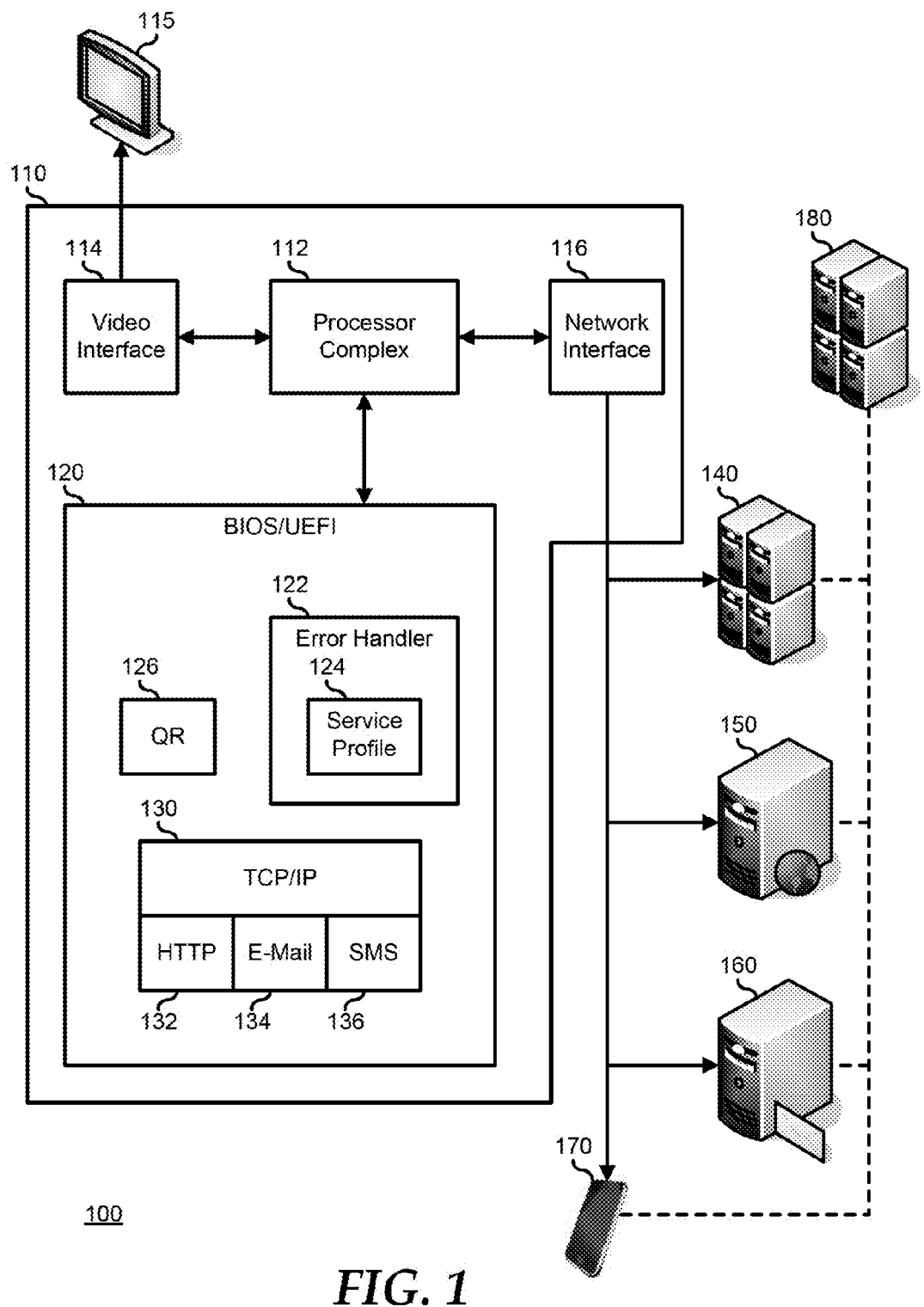
FIG. 1 is a block diagram illustrating an error handling system according to an embodiment of the present disclosure.

FIG. 1 illustrates an embodiment of an error handling system 100. For purpose of this disclosure, error handling system 100 is implemented as one or more information handling system that can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Error handling system 100 includes an information handling system 110, a display device 115, a network error handler 140, a web server 150, a mail server 160, a mobile device 170, and a back-end support system 180. Information handling system 100 includes a processor complex 112, a video interface 114, a network interface 116, and a pre-operating system (OS) operating environment, such as a Basic Input/Output System (BIOS), Universal Extensible Firmware Interface (UEFI), or another pre-OS operating environment, referred to hereinafter as BIOS 120. BIOS 120 includes an error handler 122, a Quick Response (QR) code generator 126, and a Transmission Control Protocol/Internet Protocol (TCP/IP) stack 130 with an associated Hyper Text Transfer Protocol (HTTP) engine 132, an associated e-mail engine 134, and an associated Short Message Service (SMS) engine 135. BIOS 120 operates to configure information handling system 110, including processor complex 112, video interface 114, and network interface 116, during boot-up operations and to manage I/O operations for the information handling system during run-time operations. Error handler 122 operates to detect errors during the boot-up and run-time operations of information handling system 110. The detected errors can include hardware faults, machine check exceptions, checksum errors, BIOS beep code errors, authentication errors, mis-configurations, and other errors, as needed or desired.

Information handling system 110 also operates to provide reports as to the nature and extent of the errors. In a particular embodiment, the error reports are displayed on display device 115 via video interface 114. For example, lines of text displayed on display device 115 can identify that an error of information handling system 110 has been detected, can provide additional information including information related to the nature and extent of the error, such as an error code, a machine state readout, or the like. The lines of text can also include a unique identifier for information handling system 110 and can provide information related to the resources that are available to the user of the information handling system and that can be of assistance to the user in rectifying the error. An example of resource related information can include a URL for a technical support web site, contact information for a technical support specialist or organization that is available to assist in rectifying the error, service level information for the specialist or organization, a unique identifier for information handling system 110, such as a serial number, an asset tag number, or another unique identifier, system configuration information, or other information to identify the information handling system and the level of service available to the user of the information handling system. In this regard, the text displayed on display device 115 can include a reference number associated with a service contract that covers information handling system 110.

In another embodiment, the information included in the lines of text, as described above, can be encoded by QR code generator 126 into a barcode, a Quick Response (QR) code, or another encoded device. Hereinafter, where the present disclosure references QR codes, it will be understood to include a barcode or another encoding system, except as otherwise noted herein. In this embodiment, the user of information handling system 110 can scan the QR code on a web enabled mobile device, such as a smart phone, to access the technical support web site, or to submit an e-mail or text message to the technical support specialist or organization. In a particular case, QR codes are pre-defined and stored in a non-volatile memory of information handling system 110, such as by storing bitmap (BMP) files, Graphics Interchange Format (GIF) files, Joint Photographic Experts Group (JPEG) files, or other image data files, as needed or desired. Here, different QR codes can be stored that are each associated with a different error condition. In this case, where the QR codes include system configuration information or service information, the stored QR codes can be modified and stored via a firmware update when the configuration or service information is changed. In another case, QR code generator 126 dynamically creates QR codes for each error condition. In this case, updated information related to system configuration or service information can be stored in the non-volatile memory, and can be called upon by QR code generator 126 as needed to generate a QR code for a particular error, and only the updated system configuration information and the updated service information needs to be updated when the information changes. Here, the updated information can be provided via a firmware update, or by changing a BIOS CMOS setting for information handling system 100.

In another embodiment, the error reports are provided via network interface 116 to one or more of network error handler 140, web server 150, mail server 160, and mobile device 170. Here, the error information can include the information as described above with respect to the display of QR codes. In a particular embodiment, TCP/IP stack 130 provides proprietary communications to network error handler 140. Here, network error handler 140 operates to receive the error information, establish a secure connection to information handling system 110, and actively interact with the information handling system to attempt to rectify the error. The network connection can be made secure by providing for a Virtual Private Network (VPN) between information handling system 110 and network error handler 140, by providing encrypted communications such as via a Public Key Infrastructure, or otherwise providing a secure connection. In a particular embodiment, information handling system 110 can include a management controller such as a Baseboard Management Controller, an Integrated Dell Management Controller (iDRAC), or another management controller, as needed or desired, and network error handler 140 operates to access a management network associated with the management controller to provide firmware updates to the BIOS for the information handling system in order to rectify the error.

In a further example, where the error reports are provided via network interface 116, to web server 150, HTTP engine 132 provides web interface communications to web server 150. Web server 150 operates similarly to network error handler 140 to receive the error information, establish a secure HTTP connection to information handling system 110, and actively interact with the information handling system to attempt to rectify the error. In a particular embodiment, error handler 122 provides a display on display device 115 that permits a user of information handling system 110 to interact with a user interface for a website provided on web server 150.

Mail server 160 and mobile device 170 operate to receive the error reports from e-mail engine 134 and SMS engine 136, respectively. Here, the reports are in the form of error alerts to for a technical support specialist or organization that is available to assist in rectifying the error, and can generate a work ticket for the support specialist or organization to attend to information handling system 110 by a return e-mail or text message, or to report to the location of the information handling system directly to attend to the error. It will be understood that mobile device 170 can represent a SMS server or the like.

Error handler 122 includes a service profile 124. Service profile 124 includes one or more of an IP address of network error handler 140, a Universal Resource Locator (URL) of web server 150, an e-mail address of a technical support specialist or organization on mail server 160, and a mobile phone number for mobile device 170.

Figure 2:
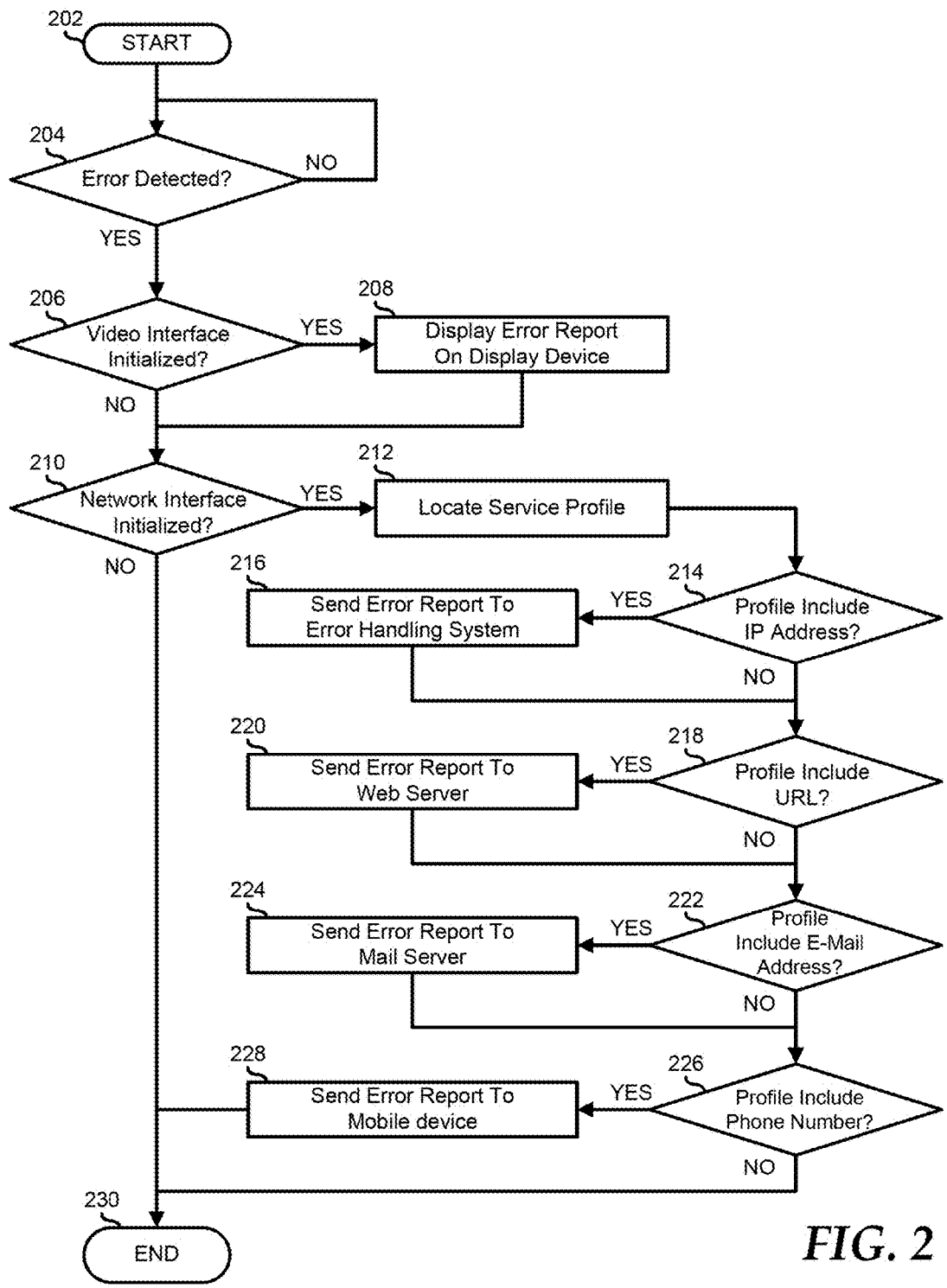
FIG. 2 is a flowchart illustrating a method for providing error reporting on the information handling system of FIG. 1 according to an embodiment of the present disclosure.

FIG. 2 illustrates a method for providing error reporting on information handling system 110, starting at block 202. A decision is made as to whether or not error handler 122 has detected an error on information handling system 110 in decision block 204. If not, the "NO" branch of decision block 204 is taken and the method loop at decision block 204 until an error is detected. When an error is detected, the "YES" branch of decision block 204 is taken, and a decision is made as to whether or not video interface 114 is initialized in decision block 206. For example, an error can be detected during boot-up operations of information handling system 110, prior to the initialization of video interface 114, or an error can be detected during run-time operations, after the initialization of the video interface. If video interface 114 has not been initialized, the "NO" branch of decision block 206 is taken and the method proceeds to decision block 210. If video interface 114 has been initialized, the "YES" branch of decision block 206 is taken, an error report describing the error is displayed on display device 115, and the method proceeds to decision block 210.

In decision block 210, a decision is made as to whether or not network interface 116 has been initialized. For example, an error can be detected during boot-up operations of information handling system 110, prior to the initialization of network interface 116, or an error can be detected during run-time operations, after the initialization of the network interface. If network interface 116 has not been initialized, the "NO" branch of decision block 210 is taken and the method ends in block 230. For example, with neither of video interface 114 nor network interface 116 initialized, the error detected in decision block 204 may not be reportable to obtain assistance in rectifying the error, and information handling system can provide a BIOS beep code, can attempt to proceed with the boot-up operations in light of the error, can attempt to reboot itself, or can halt all operations. If network interface 116 has been initialized, the "YES" branch of decision block 210 is taken and error handler 122 locates service profile 124 to determine where to report the error.

A decision is made as to whether or not service profile 124 includes an IP address of network error handler 140 in decision block 214. If not, the "NO" branch of decision block 214 is taken and the method proceeds to decision block 218. If so, the "YES" branch of decision block 214 is taken, the error report is sent via network interface 114 to network error handler 140 in block 216, and the method proceeds to decision block 218, where a decision is made as to whether or not service profile 124 includes a URL for web server 150. If not, the "NO" branch of decision block 218 is taken and the method proceeds to decision block 222. If so, the "YES" branch of decision block 218 is taken, the error report is sent via network interface 114 to web server 150 in block 220, and the method proceeds to decision block 222, where a decision is made as to whether or not service profile 124 includes an e-mail address on mail server 160. If not, the "NO" branch of decision block 222 is taken and the method proceeds to decision block 226. If so, the "YES" branch of decision block 222 is taken, the error report is sent via network interface 114 to mail server 160 in block 224, and the method proceeds to decision block 226, where a decision is made as to whether or not service profile 124 includes a phone number of mobile device 170. If not, the "NO" branch of decision block 226 is taken and the method ends in block 230. If so, the "YES" branch of decision block 226 is taken, the error report is sent via network interface 114 to mobile device 170 in block 216, and the method ends in block 230.

Returning to FIG. 1, back-end support system 180 operates to manage a service level agreement (SLA) for information handling system 110. Here, a user of information handling system 110 can contract for technical support and services for the information handling system with a technical support specialist or organization. Then, when error handler 122 sends an error report to one or more of network error handler 140, web server 150, mail server 160, or mobile device 170, the error report is forwarded to back-end support system 180 to verify that the error report includes an error that is covered under the SLA, how to respond to the error report under the SLA, and whether the SLA has changed since information handling system 110 was provided to the user. For example, when a user first receives information handling system 110, the information handling system can be provided with a standard level SLA that provides technical advice, but no on-site service. In this case, service profile 124 can include an IP address, a URL, an e-mail address, or a phone number that are all associated with the standard level SLA. Later, the user can receive an upgraded SLA from back-end support system 180, where the upgraded SLA provides for additional support, such as on-site service, or for access to a local service depot.

In this case, in a first embodiment, when an error is detected, error handler 122 will respond as directed by service profile 124 to provide the error report to the location (IP Address, URL, e-mail address, or phone number) associated with the standard level SLA. Then, when network error handler 140, web server 150, mail server 160, or mobile device 170 receives the error report, back-end support system 180 can verify to the network error handler, the web server, the mail server, or the mobile device, that information handling system 110 is supported by the upgraded SLA, and the network error handler, the web server, the mail server, or the mobile device can tailor the reply in accordance with the upgraded SLA. In a second embodiment, when back-end support system 180 provides the upgraded SLA, network error handler 140 operates to push an updated IP address, URL, e-mail address, or phone number that are all associated with the upgraded SLA via a firmware update or other update procedure to service profile 124.

Figure 3:
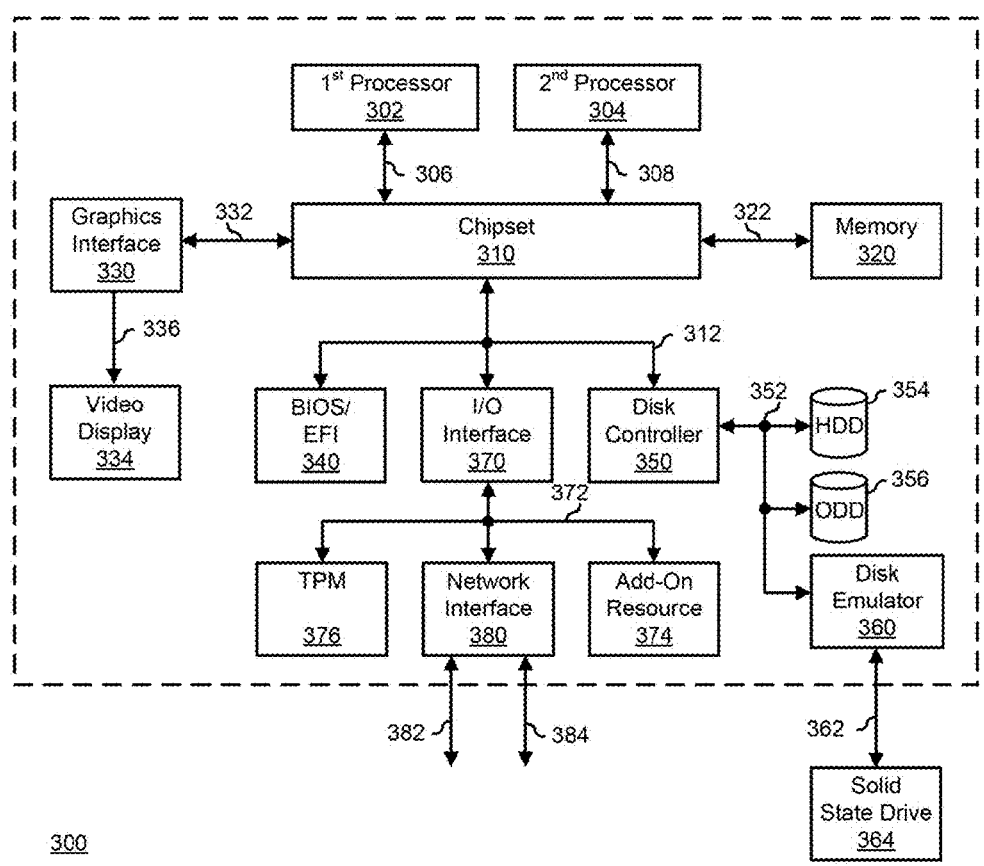
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a video interface; and
    an error handler including a service profile, wherein the error handler:
        detects an error in an operation of the information handling system;
        generates an error report in response to detecting the error;
        generates a Quick Response (QR) code based on the error report;
        sends the QR code to the video interface based upon the service profile;
        receives an updated service profile; and
        replaces the service profile with the updated service profile.

2. The information handling system of claim 1, further comprising:
    a network interface, wherein further the error handler sends the error report to the network interface based on the service profile.

3. The information handling system of claim 2, wherein the error handler further addresses the error report to a web server coupled to the network interface.

4. The information handling system of claim 2, wherein the error handler further addresses the error report to a mail server coupled to the network interface.

5. The information handling system of claim 2, wherein the error handler further addresses the error report to a Short Message Service (SMS) server coupled to the network interface.

6. The information handling system of claim 2, wherein further the error handler addresses the error report to a first web server via the network interface in response to the information handling system being associated with a first service level agreement and the error handler addresses the error report to a second web server via the network interface in response to the information handling system being associated with a second service level agreement.

7. The information handling system of claim 1, further comprising:

a display device coupled to the video interface, wherein the video interface displays the QR code on the display device.

8. The information handling system of claim 1, further comprising:
a non-volatile memory that stores the service profile.

9. The information handling system of claim 8, wherein in generating the QR code the error handler further retrieves a pre-stored QR code associated with the error from the non-volatile memory.

10. A method comprising:
detecting, by an error handler of an information handling system, an error in an operation of the information handling system;
generating an error report in response to detecting the error;
generating a Quick Response (QR) code based on the error report;
sending the QR code to a video interface of the information handling system based upon a service profile;
receiving an updated service profile; and
replacing the service profile with the updated service profile.

11. The method of claim 10, further comprising:
sending the error report to a network interface of the information handling system based on the service profile.

12. The method of claim 11, further comprising:
addressing the error report to a web server coupled to the network interface.

13. The method of claim 11, further comprising:
addressing the error report to a mail server coupled to the network interface.

14. The method of claim 11, further comprising:
addressing the error report to a Short Message Service (SMS) server coupled to the network interface.

15. The method of claim 10, further comprising:
displaying the QR code on a display device coupled to the video interface.

16. The method of claim 10, further comprising:
storing the service profile on a non-volatile memory of the information handling system.

17. A non-transitory computer-readable medium including code for performing a method, the method comprising:
detecting, by an error handler of an information handling system, an error in an operation of the information handling system;
generating an error report in response to detecting the error;
generating a Quick Response (QR) code based on the error report;
sending the QR code to a video interface of the information handling system based upon a service profile;
receiving an updated service profile; and
replacing the service profile with the updated service profile.

18. The computer-readable medium of claim 17, the method further comprising:
sending the error report to a network interface of the information handling system based on the service profile.

19. The computer-readable medium of claim 17, the method further comprising:
displaying the QR code on a display device coupled to the video interface.

20. The computer-readable medium of claim 17, the method further comprising:
storing the service profile on a non-volatile memory of the information handling system.

* * * * *